(12) United States Patent
Mathai et al.

(10) Patent No.: US 10,992,714 B2
(45) Date of Patent: Apr. 27, 2021

(54) CERTIFYING AUTHENTICITY VIA DYNAMIC DIMENSIONAL COORDINATE SCANNING AND DECENTRALIZED DATA STORAGE

(71) Applicant: International Business Machines Corporation, Armonk, NY (US)

(72) Inventors: Shiju Mathai, Carrollton, TX (US); James Appleyard, North Richland Hills, TX (US); Gregory S. Jones, Lewisville, TX (US); Jeff Edgington, Fort Worth, TX (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 16/241,878

(22) Filed: Jan. 7, 2019

(65) Prior Publication Data
US 2020/0220899 A1    Jul. 9, 2020

(51) Int. Cl.
*H04L 29/06*    (2006.01)
*G06F 16/27*    (2019.01)
*H04L 9/06*    (2006.01)
*G06Q 30/06*    (2012.01)

(52) U.S. Cl.
CPC .............. *H04L 63/20* (2013.01); *G06F 16/27* (2019.01); *G06Q 30/0601* (2013.01); *H04L 9/0637* (2013.01); *H04L 63/0876* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 8,032,760 B2 | 10/2011 | Tuyls et al. | |
| 8,705,873 B2 | 4/2014 | Voloshynovskiy et al. | |
| 9,870,496 B2 | 1/2018 | Feldman | |
| 2006/0043174 A1* | 3/2006 | Banavar | G06K 17/00 235/383 |
| 2012/0027290 A1* | 2/2012 | Baheti | G06K 9/4671 382/154 |
| 2016/0098723 A1 | 4/2016 | Feeney | |
| 2018/0053340 A1* | 2/2018 | Chui | G06T 7/32 |
| 2018/0183606 A1 | 6/2018 | High et al. | |

FOREIGN PATENT DOCUMENTS

WO    2018128539 A1    7/2018

OTHER PUBLICATIONS

H. R. Hasan et al.; "Blockchain-Based Proof of Delivery of Physical Assets With Single and Multiple Transporters," in IEEE Access, vol. 6, pp. 46781-46793; Sep. 7, 2018.

* cited by examiner

*Primary Examiner* — William J. Goodchild

(57) ABSTRACT

An example operation may include one or more of an authentication system determining authentication rules, the authentication system determining scan properties, the authentication system operating a scanning device to capture scan data for a physical object based on the scan properties and the authentication rules, the authentication system generating a data block based on the scan data and the scan properties, and the authentication system transmitting the data block to a decentralized database.

20 Claims, 14 Drawing Sheets

640

US 10,992,714 B2

CERTIFYING AUTHENTICITY VIA DYNAMIC DIMENSIONAL COORDINATE SCANNING AND DECENTRALIZED DATA STORAGE

TECHNICAL FIELD

This application generally relates to decentralized data storage and more particularly relates to certifying authenticity via dynamic dimensional coordinate scanning and decentralized data storage.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by a centralization of information, such as authentication data, that may be not be fully accessible to devices or nodes that may have a need to access or alter such data stored in a centralized database. Moreover, the centralization of authentication data may allow such data to be manipulated or altered by unauthorized entities, such as unscrupulous actors like forgers or thieves. Therefore, what is needed is a solution to overcome these significant drawbacks.

SUMMARY

One example embodiment provides a system that includes a processor and memory, wherein the processor is configured to perform one or more of determine the scan properties and authentication rules, operate a scanning device to capture scan data for a physical object based on the scan properties and the authentication rules, and generate a data block based on the scan data and the scan properties. This data block may be provided to a decentralized database.

Another example embodiment provides a method that includes one or more of an authentication system determining authentication rules, the authentication system determining scan properties, the authentication system operating a scanning device to capture scan data for a physical object based on the scan properties and the authentication rules, the authentication system generating a data block based on the scan data and the scan properties, and the authentication system transmitting the data block to a decentralized database.

A further example embodiment provides a non-transitory computer readable medium comprising instructions, that when read by a processor, cause the processor to perform one or more of determining authentication rules, determining scan properties, operating a scanning device to capture scan data for a physical object based on the scan properties and the authentication rules, generating a data block based on the scan data and the scan properties, and transmitting the data block to a decentralized database.

DETAILED DESCRIPTION

Figure 1:
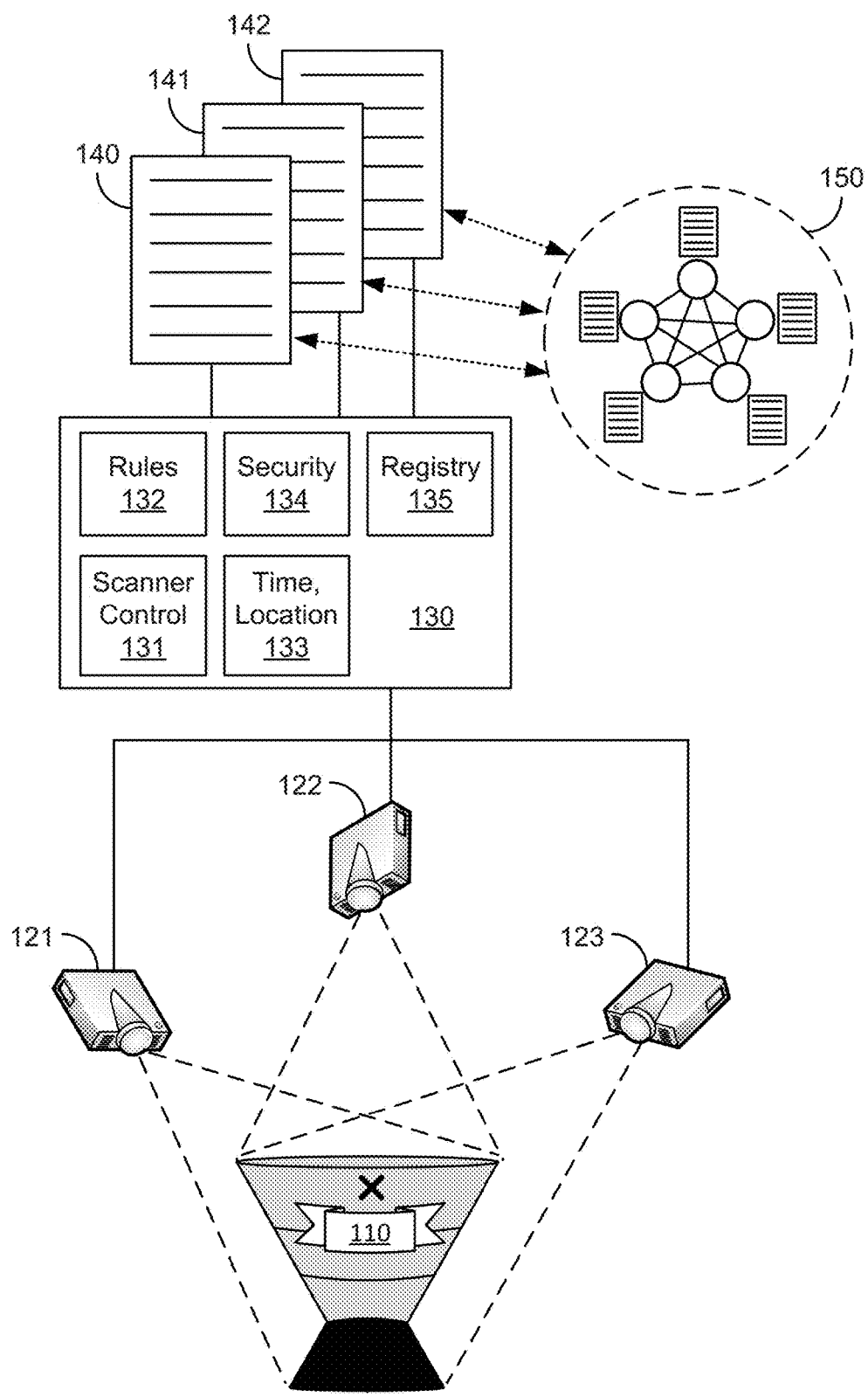
FIG. 1 illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of one or more of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide authentication using dynamic dimensional coordinate scanning facilitated by one or more decentralized databases.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the stored current state resulting from applying all transactions from the initial blockchain transaction, including the most recent blockchain transaction, and which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and/or updates that remove key value pairs from a world state or otherwise alter a world state, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all key value pairs that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, and therefore can be regenerated from the chain at any time. The state database may automatically be recovered (or generated if needed) upon peer node startup, and before transactions are accepted.

Some benefits of the instant solutions described and depicted herein include validating that an object is the object it is purported to be, authenticating the participants in a transaction involving an object, and allowing additional scan information to generated for an object based on owner input.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, authentication of high value physical objects using dynamic dimensional coordinate scanning, and the recording, altering and retrieval of data associated therewith, is implemented using certificates, smart contracts, and/or similar systems and methods that integrate scan data and other data associated with a high value object. Such systems and methods are implemented with the decentralized, accountable, and immutable characteristics that are inherent and unique to blockchain. In an example implementation, a high value physical object may be scanned based on one or more rules and scan data may be generated and recorded in a decentralized database using blockchain. Other data related to the object, such as when and where the associated scanning occurred, may also be recorded. At a proposed transfer of ownership of the object, a buyer may confirm that a purported object is genuine based on the blockchain data. The transfer of ownership may be recorded in a data block of a blockchain.

One of the benefits of the example embodiments is that it improves the functionality of a computing system by providing a way to authenticate a physical object and to generate authentication data for a physical object. Another benefit is that it provides for a decentralized database in which to store a record, such as a blockchain, of such object authentication data and transactions associated with the object. Through the blockchain system described herein, an owner of a physical object can generate authentication data for the physical object and record the authentication data in a decentralized database using blockchain, creating an accurate, immutable, and publicly available record of the authentication data. An owner can use that data to authenticate the object in the future. Likewise, a prospective buyer can use that data to authenticate the object before purchase. A transaction associated with the object, such as a change of ownership, can also be recorded in a decentralized database using blockchain.

The example embodiments provide numerous benefits over a traditional database. For example, through the blockchain the embodiments provide an accurate, immutable, and publicly available record, distributed amongst the several nodes of a decentralized database, of authentication data for a high value object and/or a transaction associated with a high value object. Meanwhile, if a traditional database were used to implement the example embodiments, the example embodiments would suffer from unnecessary drawbacks such as the susceptibility of a centralized database to unauthorized alteration that can facilitate theft, forgery, or unauthorized copying of a high value physical object by altering authentication data or transaction data at the single centralized database. Accordingly, the example embodiments provide for a specific solution to a problem in the field of high value object authentication.

The example embodiments also change how data may be stored within a block structure of the blockchain. For example, authentication data for a high value physical object, such as scan data generated by a scanning device operating under a set of specific rules, data associated with such rules, and/or transaction data associated with the high value object may be stored within a data segment of a data block, which may be identifiable based on metadata and/or a header of such a data block. By storing authentication, rule, and/or transaction data within data blocks of a blockchain, the authentication, rule, and/or transaction data may be appended to an immutable ledger through a hash-linked chain of blocks.

FIG. 1 illustrates a diagram of an example physical object authentication system using blockchain according to example embodiments. Referring to FIG. 1, the example system 100 includes a physical object 110 that may be any physical asset or object of any value. In some embodiments, object 110 can be a high value physical object, such as a valuable painting, sculpture, vase, piece of jewelry, machine, device, gem, mineral, etc., but object 110 may be any physical item. Scanning devices 121, 122, 123 represent any type of scanning device, including any type of camera or scanner capable of capturing image data of any resolution. Scanning devices 121, 122, 123 may have any dimensional capability, e.g., they each may be two-dimensional scanners or three-dimensional scanners. In some examples, each of scanning devices 121, 122, 123 may be a distinct device. In other examples, scanning devices 121, 122, 123 represent a single scanning device in three distinct positions or locations. Embodiments using any number of scanning devices, each of which may be positioned in any number of locations, are contemplated.

A scanning controller 130 may be coupled with or otherwise communicatively connected to scanning devices 121, 122, 123. The scanning controller 130 represents any one or more computers, systems, logic, hardware, software, scanners, or any combination thereof, that can obtain and process scans of a physical object as described herein. The scanning controller 130 may operate using one or more modules, each of which represents any hardware, software, logic, device, system, or any combination thereof. All such modules may be integrated into one device or system, or may be distributed across multiple systems and/or locations.

The example system 100 may operate according to one or more rules, which may be stored at or otherwise determined by rules module 132. An example rule is a number of scans that are to be taken of a physical object. For example, the rules module 132 may include a rule that five scans must be taken of object 110. Such rules may be configurable by a user of the system 100.

Properties or characteristics associated with each scan may be generated or determined by the system 100. Such properties may include an area of the object to be scanned, coordinates of such an area, an angle of a scanning device relative to the object to be scanned, a center point on the object as a reference for a scan, coordinates of such a center point, one or more scanning algorithms, and/or one or more indications of any of these. Each scan to be obtained for an object, such as each scan of the object 110 as determined by the rules module 132 of system 100, may have its own set of such properties. These properties may be dynamically generated by the system 100 and unavailable and/or unreadable by human operators of such a system. Such properties may be encrypted and/or may be represented by a hash in a data block of a blockchain.

In an example, upon the initial creation of an entry for the object 110 into a registry of objects, the rules module 132 may indicate that three scans of the object 110 are to be performed. A scanner control module 131 may determine the properties of each of the three scans that are to be performed. The scanner module 131 may determine such properties by obtaining the properties from the rules module 132, deriving the properties from data obtained from the rules module 132, generating the properties based on data obtained from rules module 132, generating the properties independently of rules associated with the rules module 132, or any combination thereof.

Based on the properties, the scanner control module 131 will instruct each of scanning devices 121, 122, 123 to capture an image of, or otherwise generate scan data for, object 110. More specifically, the scanner control module may instruct scanning device 121 to obtain an image of a specified area of object 110, captured from a specified angle relative to object 110, and using a particular coordinate point on object 110 (indicated as 'X' in FIG. 1) as a center point of the image. Similarly, the scanner control module may instruct scanning device 122 to obtain an image of a specified area of object 110, captured from a specified angle relative to object 110, and using a particular coordinate point on object 110 (indicated as 'X' in FIG. 1) as a center point of the image. Likewise, the scanner control module may instruct scanning device 123 to obtain an image of a specified area of object 110, captured from a specified angle relative to object 110, and using a particular coordinate point on object 110 (indicated as 'X' in FIG. 1) as a center point of the image. In other examples, the scanner control module 131 may instruct a single scanner to capture a scan at each of the positions 121, 122, 123, specifying an area and a center point for each such image. Other examples may use any number of scans, scanner positions, center points, scan areas, and/or any other properties that may be used or associated with an image.

The resulting scans may be hashed and a resulting data block 140 may be generated. Other information may be included in the data used to generate the data block 140, such as the properties used to capture each scan and/or time and/or date information, for example, that may be obtained or generated by a time/location module 133 of scanning controller 130. In other examples, such other information may also, or instead, be separately stored and refer to data block 140 and/or its associated blockchain, for example in a smart contract including a reference to the data block 140 and/or its associated blockchain. Ownership information may also be stored in the data block 140, but may also, or instead, be separately memorialized, for example in a smart contract including a reference to the data block 140 and/or its associated blockchain. The data block 140 may be added to, or used to create, a blockchain that may be stored in registry 135 and may be propagated to other blockchain nodes and/or blockchain platform(s) of blockchain system 150.

When ownership of an object, such as the object 110, changes, the system 100 may be used. For example, there can be a buyer and a seller who wish to take part in a transaction where object 110 changes ownership from the seller to the buyer. Such a buyer and seller may settle on a time and location of the exchange, for example, based on a list of specific locations that may be able to facilitate a verification of authenticity of objects such as object 110. For example, such specific locations may be equipped with the prerequisite equipment (e.g., scanning devices, scanner controllers, blockchain system connectivity, etc.) needed to verify the authenticity of a physical object.

Initially, such a buyer and seller, for example upon meeting at a designated time and location of the exchange, may authenticate one another using any type of identification and/or verification technology, including, but not limited to, passwords, biometrics, verification of identification documents, etc. Authentication may also include verification of a system location and an exchange date and time, amongst any other authentication information. Such authentication may serve, for example, as a key that allows an object authentication process to continue. Such authentication may be facilitated by system 100's security module 134, which may be configured not to perform an authentication process until such authentication has been completed. Security module 134 may also include information needed to decrypt or otherwise determine scan data and properties from a data block, thus ensuring that only a properly registered system can access such data and validate objects using such data.

Upon buyer/seller authentication, a process similar to that described above may be used to authenticate the object to be exchanged. For example, system 100 may operate according to one or more rules, which may be stored at or otherwise determined by rules module 132, and which may be the same as or similar to rules used in the initial acquisition of authentication information for object 110. A number of scans may be taken of physical object 110 to be exchanged, based on rules in rules module 110. For example, the rules module 132 may include a rule that five scans must be taken of object 110 in order to validate object 110. Such scans may have properties or characteristics associated with each scan, such as those properties or characteristics associated with rules used in the initial acquisition of authentication information for object 110. Here again, such properties may include an area of the object to be scanned, coordinates of such an area, an angle of a scanning device relative to the object to be scanned, a center point on the object as a reference for a scan, coordinates of such a center point, one or more scanning algorithms, and/or one or more indications of any of these. Here again also, each scan to be obtained for an object, such as each scan of the object 110 as determined by the rules module 132 of system 100, may have its own set of such properties. As with the initial acquisition of authentication information for object 110, scan properties may be dynamically generated by the system 100 and unavailable and/or unreadable by human operators of such a system. Such properties may be encrypted and/or may be represented by a hash in a data block of a blockchain. In the authentication of an object that has had authentication information determined, a validating system may dynamically determine and generate rules and properties for scans from rules and properties that were previously generated at the initial generation of authentication information for the object and that may be unavailable and/or unreadable by human operators of such a system.

Based on the properties, the scanner control module 131 may instruct each of scanning devices 121, 122, 123 to capture a scan of object 110 that may be used to validate object 110. More specifically, and according to a determination of the rules and properties used to generate initial authentication information for object 110, the scanner control module may instruct scanning device 121 to obtain an image of a specified area of object 110, captured from a specified angle relative to object 110, and using a particular coordinate point on object 110 (indicated as 'X' in FIG. 1) as a center point of the image. Similarly, the scanner control module may instruct scanning device 122 to obtain an image of a specified area of object 110, captured from a specified angle relative to object 110, and using a particular coordinate point on object 110 (indicated as 'X' in FIG. 1) as a center point of the image. Likewise, the scanner control module may instruct scanning device 123 to obtain an image of a specified area of object 110, captured from a specified angle relative to object 110, and using a particular coordinate point on object 110 (indicated as 'X' in FIG. 1) as a center point of the image. In other examples, the scanner control module 131 may instruct a single scanner to capture a scan at each of the positions 121, 122, 123, specifying an area and a center point for each such image. Other examples, also according to a determination of the rules and properties used to generate initial authentication information for object 110, may use any number of scans, scanner positions, center points, scan areas, and/or any other properties that may be used or associated with an image.

The resulting scans may be hashed and a resulting data block 141 may be generated. Other information may be included in the data used to generate the data block 141, such as the properties used to capture each scan and/or time and/or date information, for example, that may be obtained or generated by a time/location module 133 of scanning controller 130. System 100 may compare data block 141 to data block 140 (generated during the initial collection of authentication information for object 110) to determine whether object 110 is indeed the same object 110. This may include a comparison of the actual data blocks and/or one or more comparisons of one or more subsets of data in, or derivable from, data blocks 140 and 141. If one or more of such comparisons fail, a notification of this failure may be generated and presented to system users. If there are no comparison failures (i.e., system 100 validates that object 110 is indeed the same object 110 used to generate the initial authentication information), a notification of this authentication may be generated and presented to system users.

In an example, the data block 141 may be added to a blockchain that may be stored in registry 135 and may be propagated to other blockchain nodes and/or blockchain platform(s) of blockchain system 150. Data block 141 therefore represents an authentication performed subsequent to that associated with the data block 140.

In another example, the new owner of object 110 may provide different or additional rules to system 100 and may generate a new authentication data block 142. For example, a new owner may adjust the rules of rules module 132 to use ten scans of object 110 at varying angles and of varying areas of the object. System 100 may capture images using these rules and the resulting scans may be hashed and a resulting data block 142 may be generated. Other information may be included in the data used to generate the data block 142, such as the properties used to capture each scan and/or time and/or date information, for example, that may be obtained or generated by a time/location module 133 of scanning controller 130. In other examples, such other information about the authentication of object 110 may also, or instead, be separately stored and refer to data block 140 and/or its associated blockchain, for example in a smart contract including a reference to the data block 142 and/or its associated blockchain. Ownership information may also be stored in the data block 142, but may also, or instead, be separately memorialized, for example in a smart contract including a reference to the data block 142 and/or its associated blockchain. The data block 142 may be added to, or used to create, a blockchain that may be stored in registry 135 and may be propagated to other blockchain nodes and/or blockchain platform(s) of blockchain system 150. Data block 142 therefore represents an authentication performed subsequent to that associated with the data block 140.

Note that this comparison process may be repeated any number of times. At each such authentication, a current scan data block and/or data derived from such a data block may be used for comparison to the most recent previously generated data block. A new or current owner of an object such as object 110 may generate a new data block using the same or adjusted rules as those used to create the most recent data block.

Figure 2A:
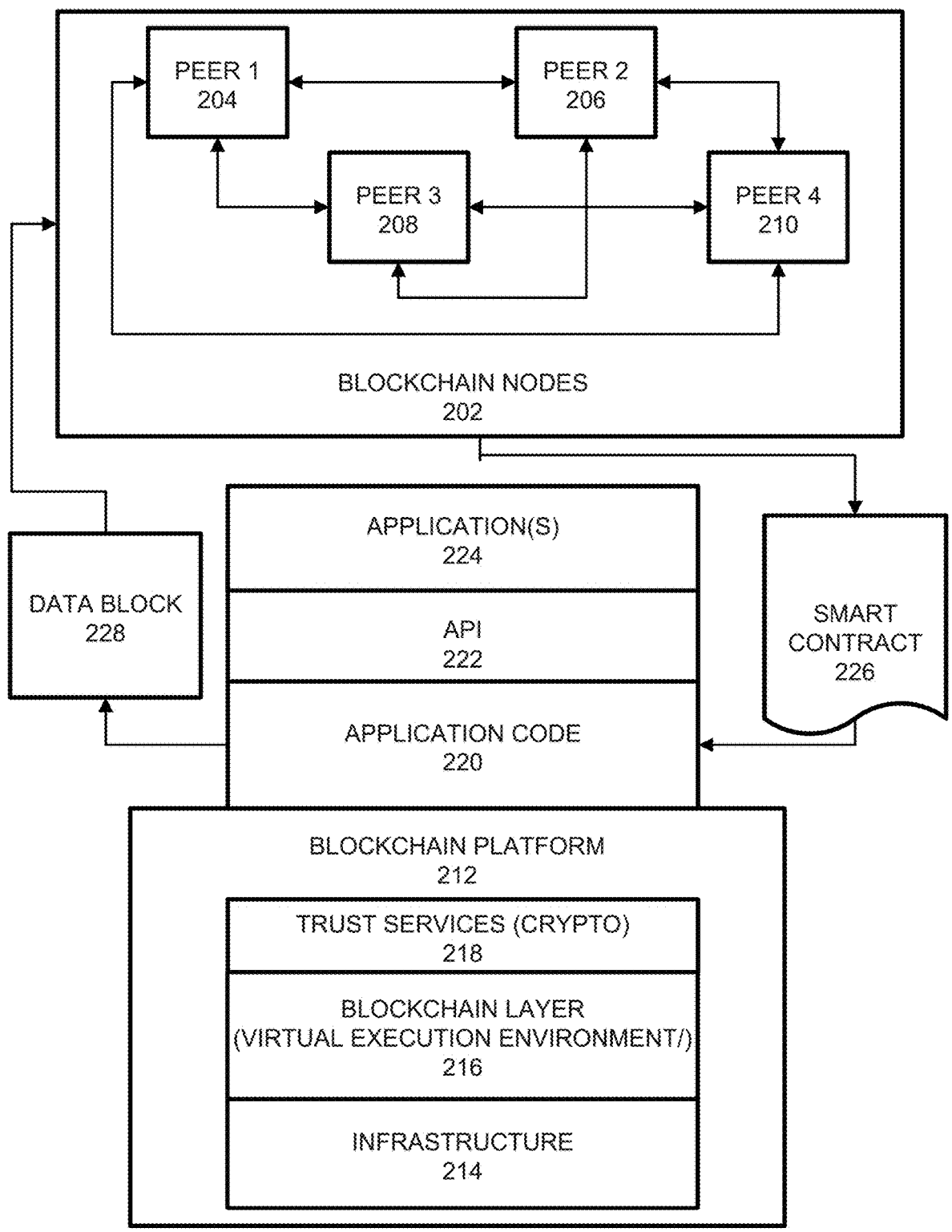
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as a blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may represent or indicate one or more aspects of an object authentication process or system (e.g., rules used to obtain or generate object scans) and may be processed by one or more processing entities (e.g., virtual machines) included in the blockchain layer 216. The result may be indicated by data block 228, which may include one or more scans of an object, properties of such scans, rules used to obtain such scans, and/or any other authentication information or hashes thereof. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a smart contract 226 may be created, entered into, or otherwise determined that sets forth parameters for performing object authentication and exchange. The smart contract 226 may be used to authenticate an object and the exchange may be performed. Upon completion of the exchange, for example when an object has been authenticated and ownership has been transferred, a block chain data block 228 may be generated by architecture 200. Data block 228 may be generated reflecting the scan information generated upon exchange of the item as represented by smart contract 226. Data block 228 may also reflect the scanning rules and/or terms and properties of the exchange of the item as represented by smart contract 226. Alternatively, data block 228 may be generated reflecting the scan information generated upon exchange of the item as represented by smart contract 226, and a separate data block, for example, referencing data block 228, may reflect the scanning rules and/or terms and properties of the exchange of the item as represented by smart contract 226. This data block (or all data blocks where more than one is used) may be provided to one or more of the nodes 204-210.

Figure 2B:
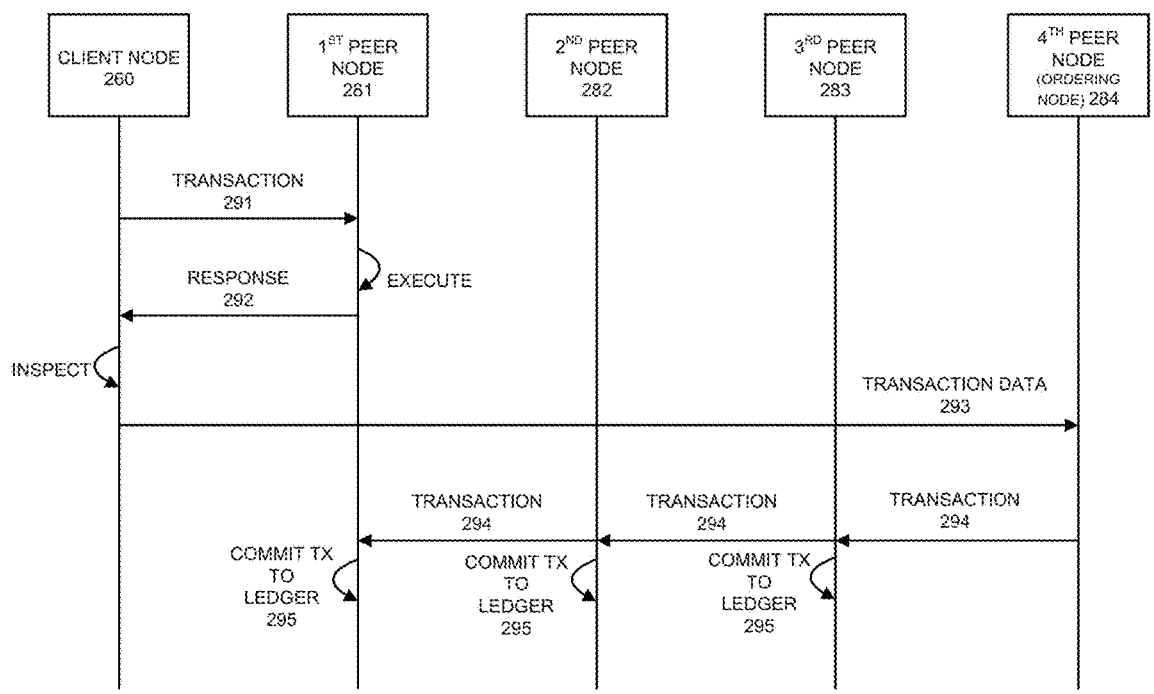
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers' signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers' signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
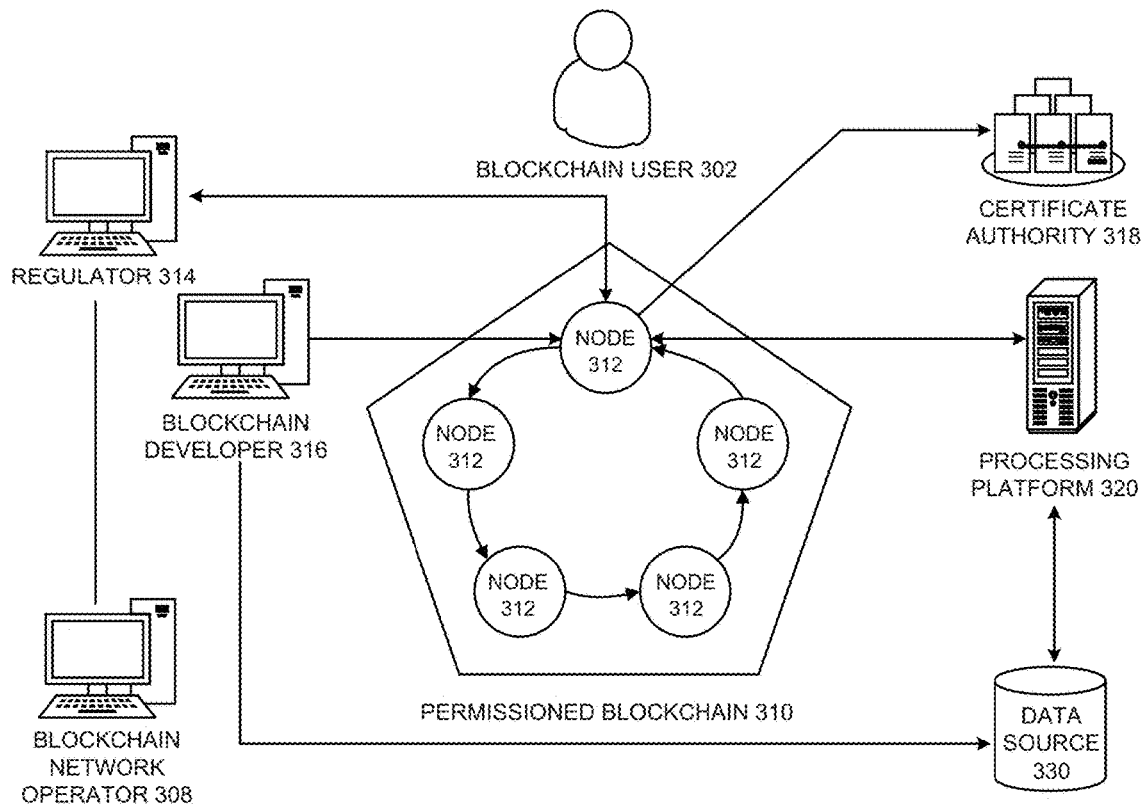
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
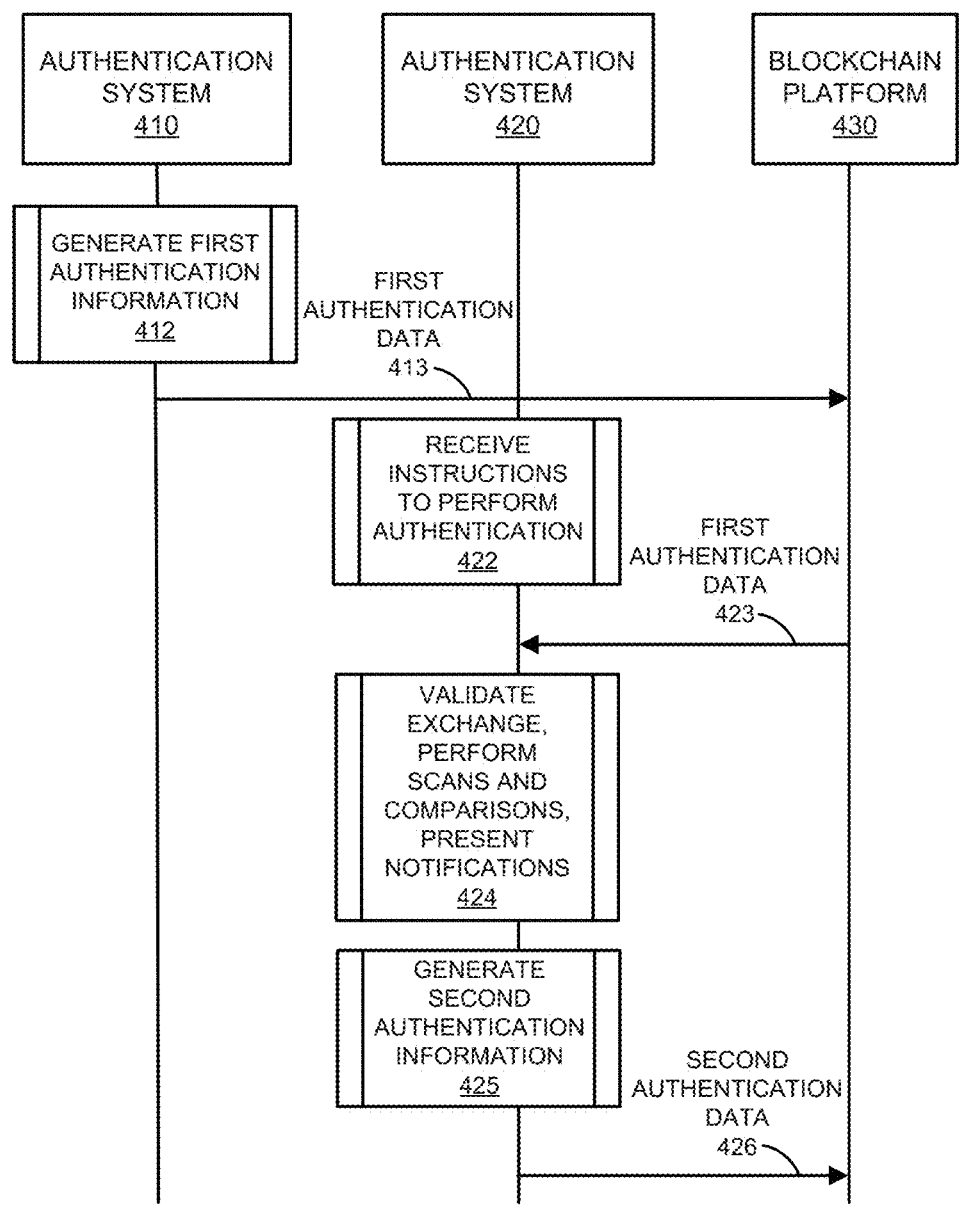
FIG. 4 illustrates a system messaging diagram, according to example embodiments.

FIG. 4 illustrates a system messaging diagram for authenticating an object and exchanging ownership of the object according to example embodiments. Referring to FIG. 4, the system diagram 400 includes authentication systems 410 and 420 that each may be any authentication system as described herein or otherwise capable of performing the functions set forth herein. The system diagram 400 also includes a blockchain platform 430 that may facilitate and/or perform blockchain functions and processes.

At block 412, first (e.g., initial or current) authentication information for an object may generated at the authentication system 410. As noted herein, authentication information may include scan data of an object captured using any number of scanning devices operating according to one or more rules and associated properties. Such scan data, properties, and/or rules, or information associated therewith, may be hashed or otherwise used to generate a data block 413 representing authentication data. First authentication data 413 may be provided to a blockchain platform 430 to become part of, or create, a block chain. A copy of the resulting data block and/or blockchain may also be stored locally at the authentication system 410.

At block 422, the authentication system 420 may receive instructions to perform an authentication, for example pursuant to a pending exchange. The authentication system 420 may obtain the first authentication data 423 having scan data associated with an object. The authentication system 420 may also obtain data needed to validate a buyer, a seller, a time of exchange, a location of exchange, and/or any other data associated with an exchange. Such exchange data may be part of a data block in a block chain having scan data associated with an object, or may be separately stored and obtain, for example through a smart contract.

At block 424, the authentication system 420 may first validate the exchange, for example by using buyer, seller, time of exchange, location of exchange, scanning rules, terms, properties, and/or any other data associated with an exchange to confirm that the exchange is authorized, for example, between the indicated buyer and seller at the indicated time and place. In an embodiment, such data may be determined from a data block that may be the same as, or distinct from, a data block containing scan data associated with an object to be exchanged.

Further at block 424, the system 420 may perform scans of the object using the properties and/or rules associated with the first authentication data received at 423. The scan data generated by system 420 at block 424 may be compared to the scan data of first authentication data 423. If the scan data generated by system 420 fails the comparison to the scan data of first authentication data 423, the users may be presented with a notification indicating this, using any manner of notification.

If the scan data generated by system 420 successfully compares to the scan data of first authentication data 423, the users may instead be presented with a notification indicating that the object has been authenticated, using any manner of notification. At block 425, system 420 may generate second authentication data 426 that may include scan data generated at system 420. Such scan data may be the scan data generated for use in comparison to the first authentication data. Alternatively, authentication system 420 may generate another set of scan data for use in generating the second authentication data 426. This other set of scan data may be generated using the rules and properties used to generate the scan data used for comparison to the first authentication data or it may be generated using a new set of rules and properties that may be provided by the successful buyer of the object participating in the exchange.

At block 425, the authentication system 420 may also generate a record of the buyer, seller, time of exchange, location of exchange, scanning rules, terms, properties, and/or any other data associated with the exchange to confirm that the exchange occurred. In an embodiment, such data may be generated as part of the newly generated scan data and stored in the same data block, or such may be stored distinct from the newly generated data block, for example, in a separate data block that may reference the data block with the scan data associated with the object exchanged.

Second authentication data 426 may be provided to a blockchain platform 430 to become part of, or create, a block chain. A copy of the resulting data block and/or blockchain may also be stored locally at the authentication system 420.

Figure 5A:
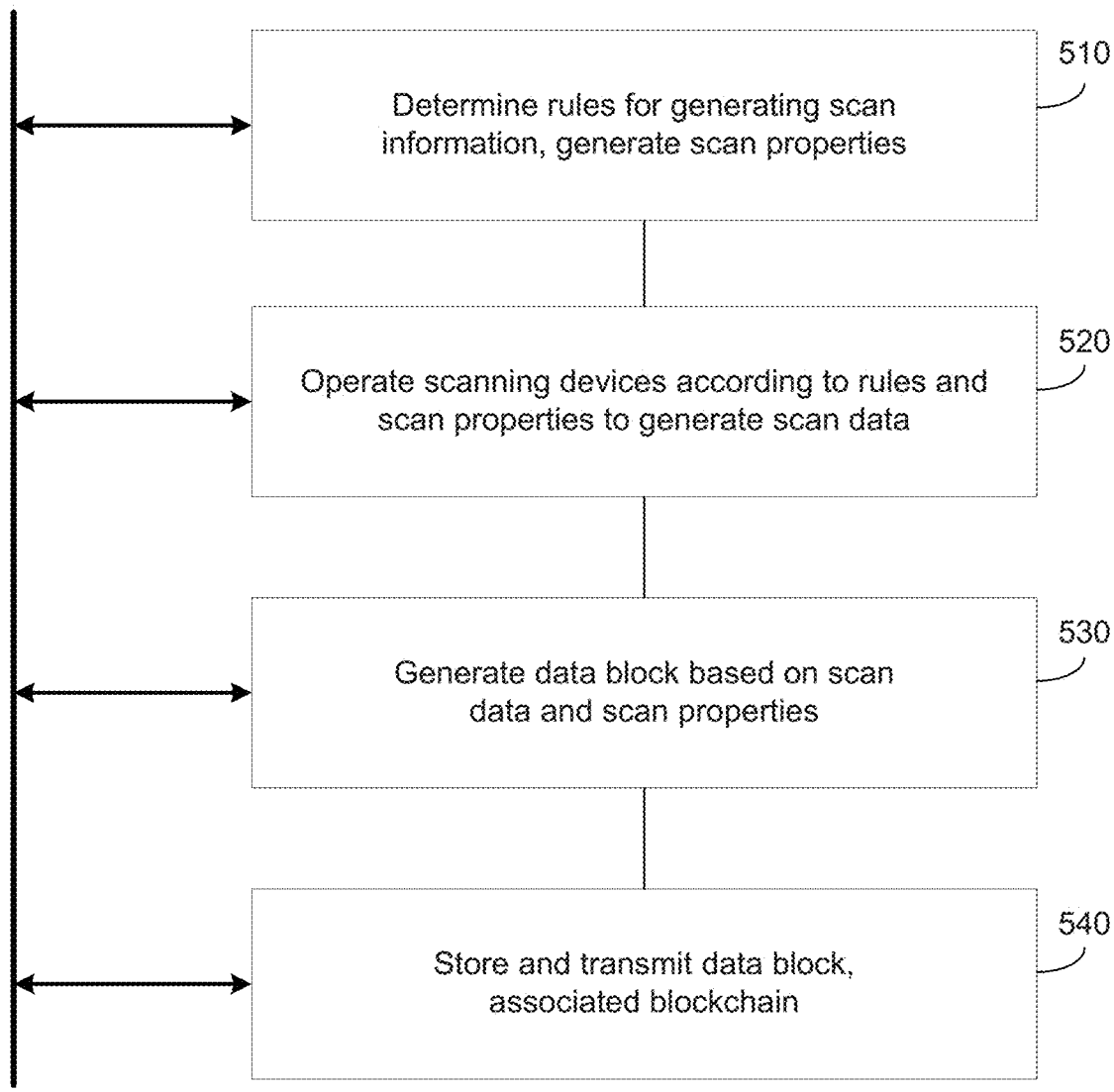
FIG. 5A illustrates a flow diagram, according to example embodiments.

FIG. 5A illustrates a flow diagram 500 of an example method of generating authentication data for a physical object that may be performed by an authentication system, according to example embodiments. Communications, including any indications and notifications of method 500, may facilitated by a blockchain platform and/or by a system supporting or associated with a blockchain platform.

Referring to FIG. 5A, the method 500 may include block 510 where rules for generating scan data may be determined. An example rule is a number of scans that are to be taken of a physical object. For example, a rule may be that five scans must be taken of an object to be scanned. Any other rules associated with an authentication system are contemplated. All such rules may be set by a user and/or standardized in some manner. Properties or characteristics associated with each scan may be generated or determined by an authentication system based on such rules. Such properties may include an area of the object to be scanned, coordinates of such an area, an angle of a scanning device relative to the object to be scanned, a center point on the object as a reference for a scan, coordinates of such a center point, one or more scanning algorithms, and/or one or more indications of any of these. Each scan to be obtained for an object may have its own set of such properties. These properties may be dynamically generated by the authentication system and unavailable and/or unreadable by human operators of such a system. Such properties may be encrypted and/or may be represented by a hash in a data block of a blockchain.

The method 500 may also include block 520, where an authentication system may operate one or more scanning devices based on the rules and properties of block 510 to capture images or otherwise generate scan data. This may include instructing each of a plurality of scanning devices to capture one or more images of an object using the properties and rules.

At block 530, the resulting scan data may be hashed and a resulting data block may be generated. Other information may be included in the data used to generate the data block, such as the properties used to capture each scan and/or time and/or date information associated with the scan data. At block 540, this resulting data block and/or its associated block chain may be stored (e.g., locally) and may be added to, or used to create, a blockchain that may be stored (e.g., in a registry). This data block and/or its associated block chain may be transmitted to other blockchain nodes and/or blockchain platform(s) of a blockchain system at block 540. In other examples, associated information may also, or instead, be separately stored and refer to a data block representing scan data and/or its associated blockchain, for example in a smart contract including a reference to such a data block and/or its associated blockchain. Ownership information may also be generated and stored, and associated with a data block associated with scan data and/or its associated blockchain, for example, in a smart contract.

Figure 5B:
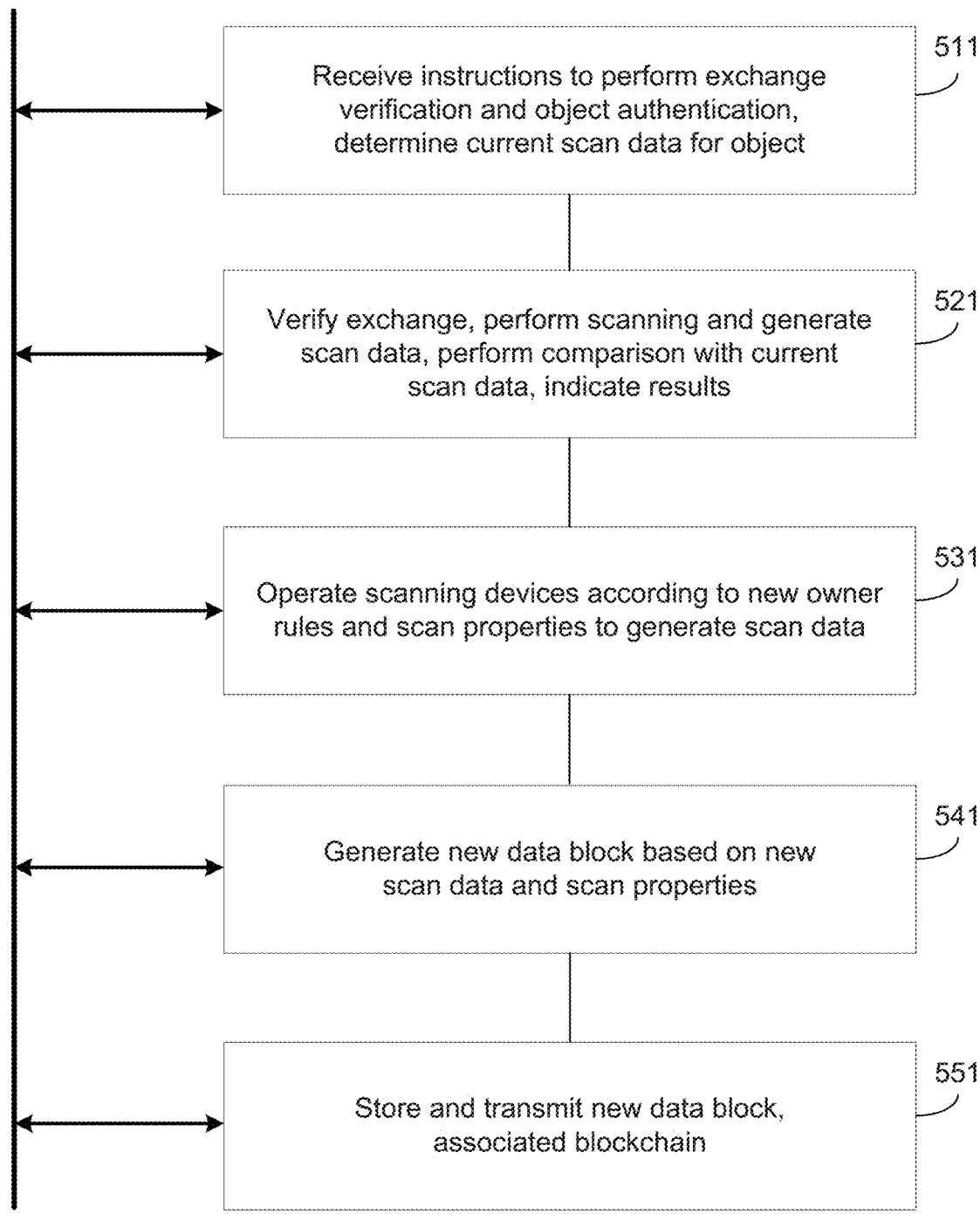
FIG. 5B illustrates a further flow diagram, according to example embodiments.

FIG. 5B illustrates a flow diagram 501 of an example method of validating authentication data for the exchange of a physical object that may be performed by an authentication system, according to example embodiments. Communications, including any indications and notifications of method 501, may facilitated by a blockchain platform and/or by a system supporting or associated with a blockchain platform.

Method 501 may include block 511, at which an authentication system may receive instructions or another indication that an exchange of an object is planned or there is otherwise a need to perform an object authentication. The instructions or indication at block 511 may include exchange data, current scan data for the object, indications of where to obtain current scan data, or any other data that may be used to obtain or generate current scan data for the object and any other data that may be used to authenticate the object and/or verify the exchange.

At block 521, an authentication system may verify that a proposed exchange is authorized. A buyer and seller, for example upon meeting at a designated time and location of the exchange, may authenticate one another via an authentication system using any type of identification and/or verification technology, including, but not limited to, passwords, biometrics, verification of identification documents, etc. Authentication may also include verification of the authentication system's location and an exchange date and time, as well as any other authentication information. Such authentication may serve, for example, as a key that allows an object authentication process to continue. Such authentication may be facilitated by security features of an authentication system, which may be configured not to perform or complete an authentication process until such authentication has been completed. Security features of an authentication system may also obtain or determine information needed to decrypt or otherwise determine scan data and properties from a data block, thus ensuring that only a properly registered system can access such data and validate objects using such data.

Upon verification of the exchange (e.g., authentication of the buyer and seller), at block 521 an authentication process may be used to authenticate the object to be exchanged. For example, the authentication system may operate according to one or more rules that may be the same as or similar to rules used in the initial acquisition of authentication information for the object to be exchanged. A number of scans may be taken of the physical object to be exchanged, based on a set of rules. For example, a rule may be that five scans must be taken of the object in order to validate it. Such scans may have properties or characteristics associated with each scan, such as those properties or characteristics associated with rules used in the initial acquisition of authentication information for the object to be exchanged. Here again, such properties may include an area of the object to be scanned, coordinates of such an area, an angle of a scanning device relative to the object to be scanned, a center point on the object as a reference for a scan, coordinates of such a center point, one or more scanning algorithms, and/or one or more indications of any of these. Here again also, each scan to be obtained for an object may have its own set of such properties. As with the initial acquisition of authentication information for the object, scan properties may be dynamically generated by an authentication system and may be unavailable and/or unreadable by human operators of such a system. Such properties may be encrypted and/or may be represented by a hash in a data block of a blockchain. In the authentication of an object that has had authentication information determined, a validating authentication system may dynamically determine and generate rules and properties for scans from rules and properties that were previously generated at the initial generation of authentication information for the object and that may be unavailable and/or unreadable by human operators of such a system.

Based on the properties, the authentication system instructs each of its scanning devices to capture one or more scans of the to be exchanged. Such scans may be used to validate the object. More specifically, and according to a determination of the rules and properties used to generate initial authentication information for the object, the authentication system may instruct each of its scanning devices to obtain an image of a specified area of the object, captured from a specified angle relative to the object, and using a particular coordinate point on the object as a center point of the image. Other examples, also according to a determination of the rules and properties used to generate initial authentication information for the object, may use any number of scanning devices, scans, scanner positions, center points, scan areas, and/or any other properties that may be used or associated with an image.

Further at block 521, the resulting scans may be hashed and a resulting data block may be generated. Other information may be included in the data used to generate such a data block, such as the properties used to capture each scan and/or time and/or date information. The authentication system may compare the newly generated data block to the data block generated during the initial collection of authentication information for the object to be exchanged in order to determine whether the object is indeed the same object. This may include a comparison of the actual data blocks and/or one or more comparisons of one or more subsets of data in, or derivable from, each such data blocks. If one or more of such comparisons fail, a notification of this failure may be generated and presented to system users to indicate the comparison result. If there are no comparison failures (i.e., the authentication system validates that the object is indeed the same object used to generate the initial authentication information), a notification of this authentication may be generated and presented to system users to indicate the comparison result.

At block 531, the new owner of the object may provide different or additional rules to the authentication system, which may generate another authentication data block for the object using such rules. For example, a new owner may configure a rule that ten scans of the object at varying angles and of varying areas of the object are to be taken. The authentication system may capture images using these rules.

At block 541, the resulting scans may be hashed and a resulting data block may be generated. Other information may be included in the data used to generate the new data block, such as the properties used to capture each scan and/or time and/or date information. In other examples, such other information about the authentication of the object may also, or instead, be separately stored and may refer to the new data block and/or its associated blockchain, for example in a smart contract including a reference to the new data block and/or its associated blockchain. Ownership information may also be stored in the new data block, but may also, or instead, be separately memorialized, for example in a smart contract including a reference to the new data block and/or its associated blockchain.

At block 551, the new data block may be added to, or used to create, a blockchain that may be stored in a local registry and may be propagated to other blockchain nodes and/or blockchain platform(s) of a blockchain system. This new data block therefore represents an authentication performed subsequent to that associated with the earlier data block obtained or determined at block 511.

Note that this comparison process 501 may be repeated any number of times. At each such authentication, a current scan data block and/or data derived from such a data block may be used for comparison to the most recent previously generated data block. A new or current owner of an object may generate a new data block using the same or adjusted rules as those used to create the most recent data block.

Figure 6A:
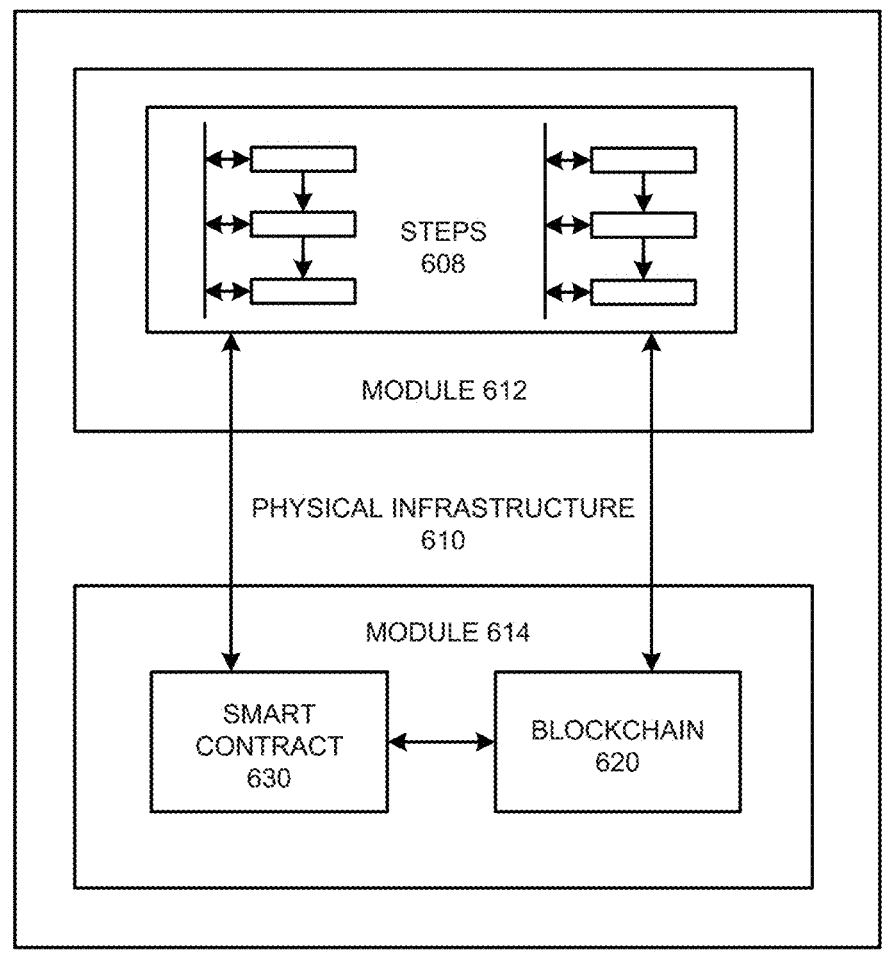
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
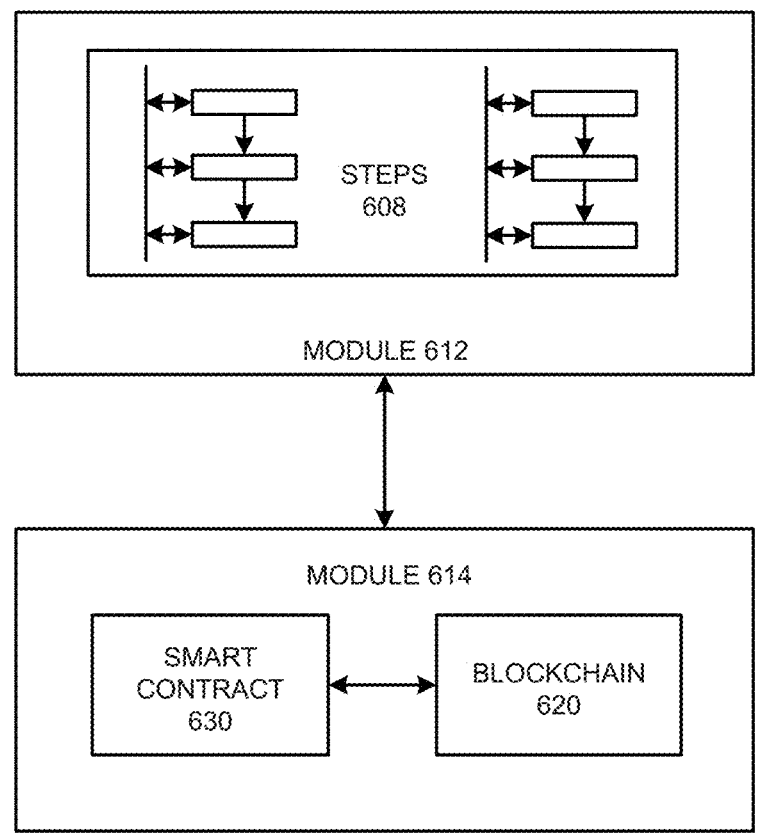
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
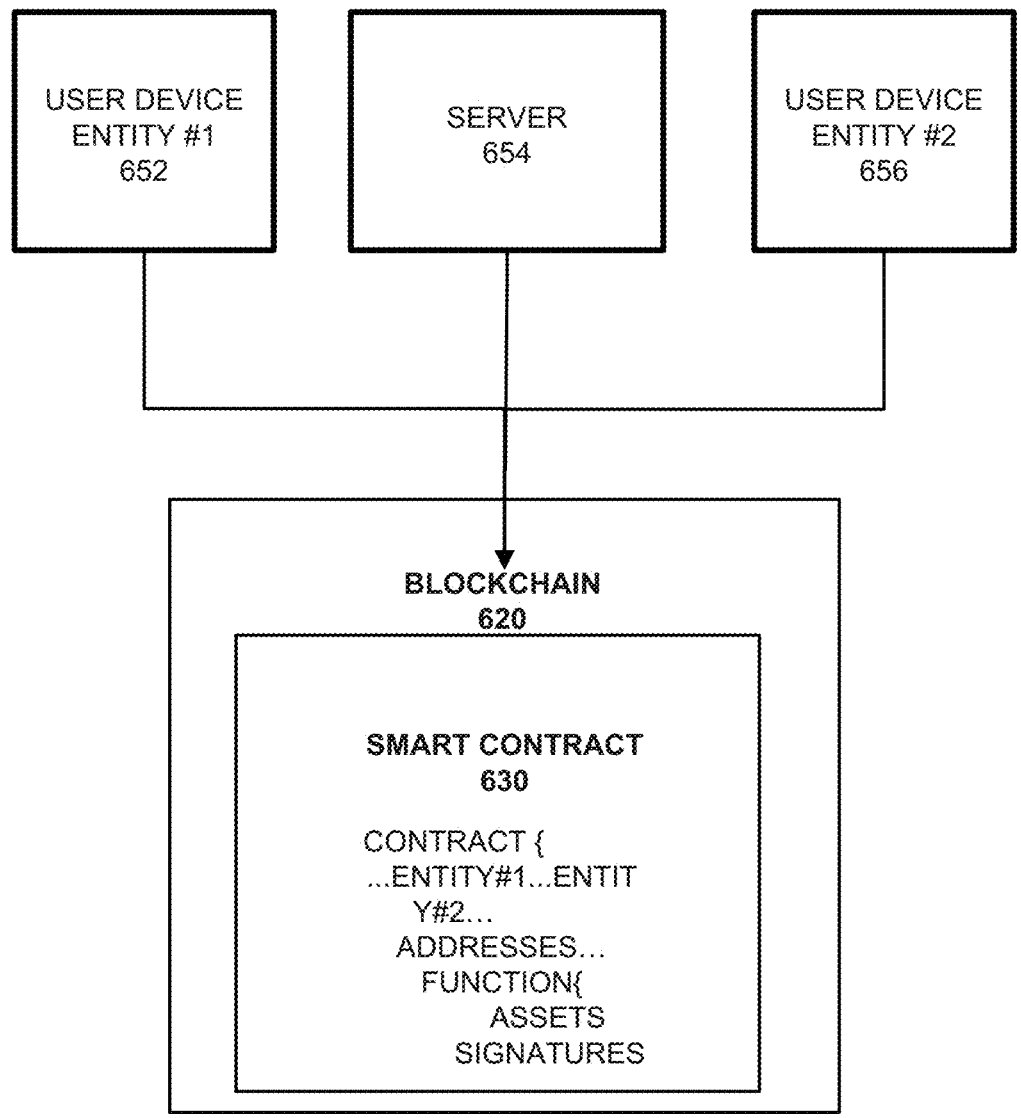
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
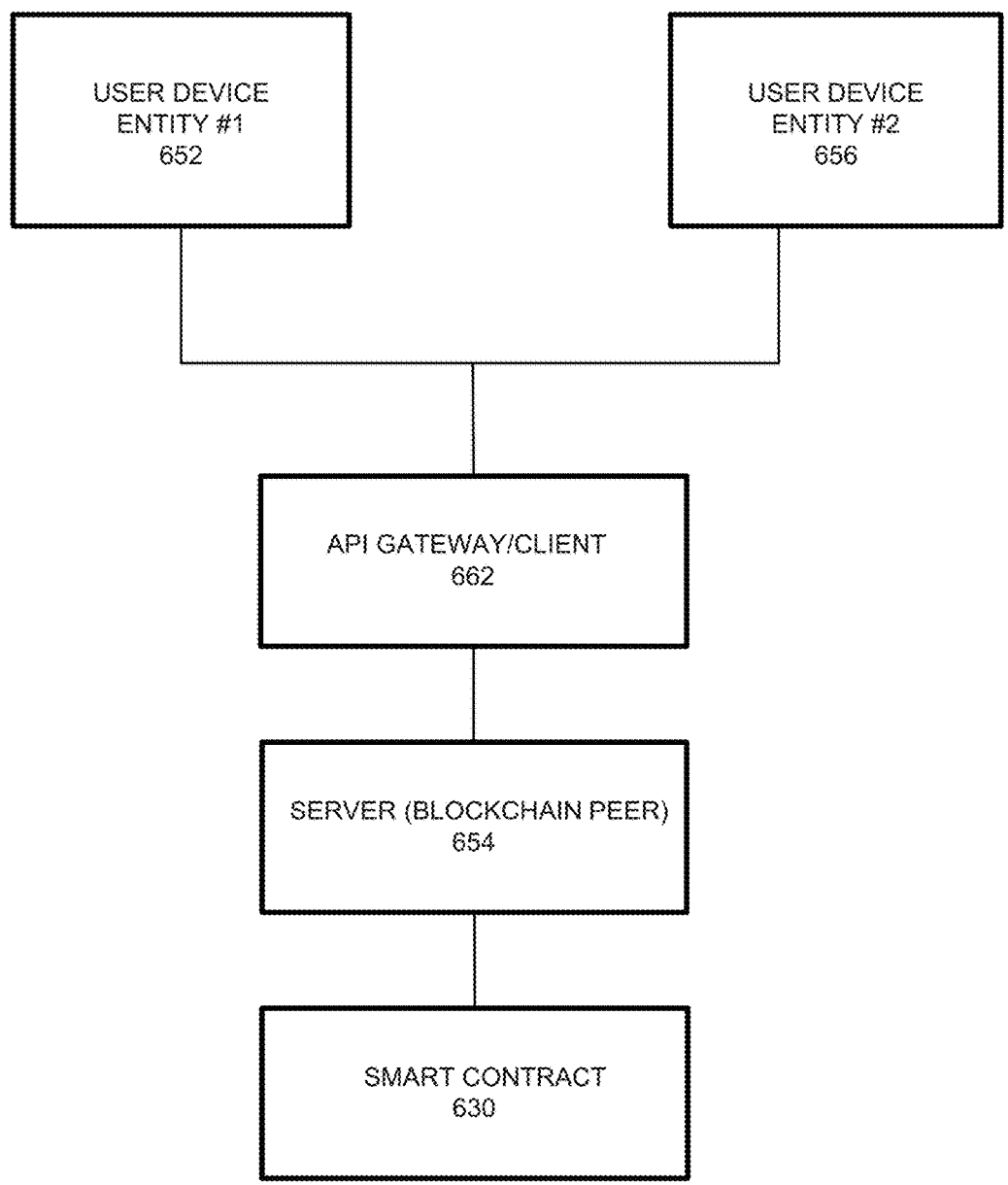
FIG. 6D illustrates another an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), DVD-ROM, flash storage, solid-state drive (SSD), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
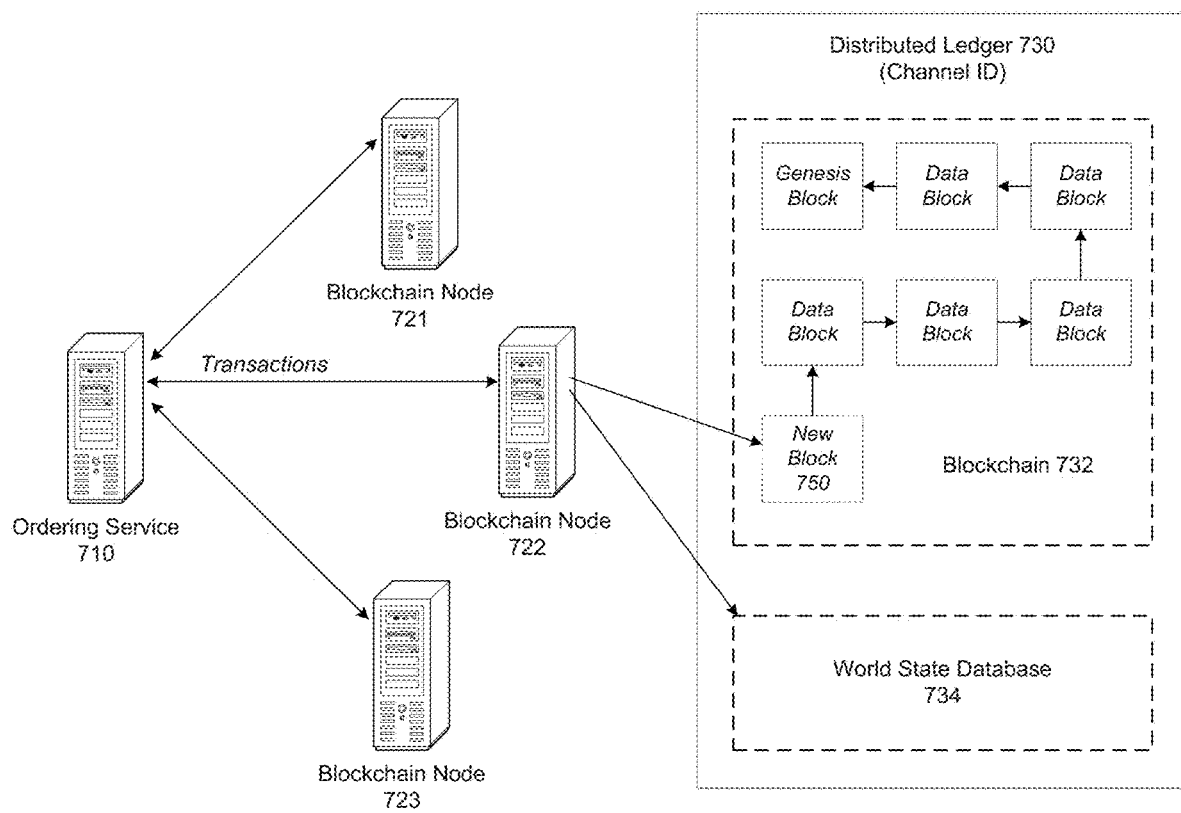
FIG. 7A illustrates a process of new data being added to a database, according to example embodiments.
Figure 7B:
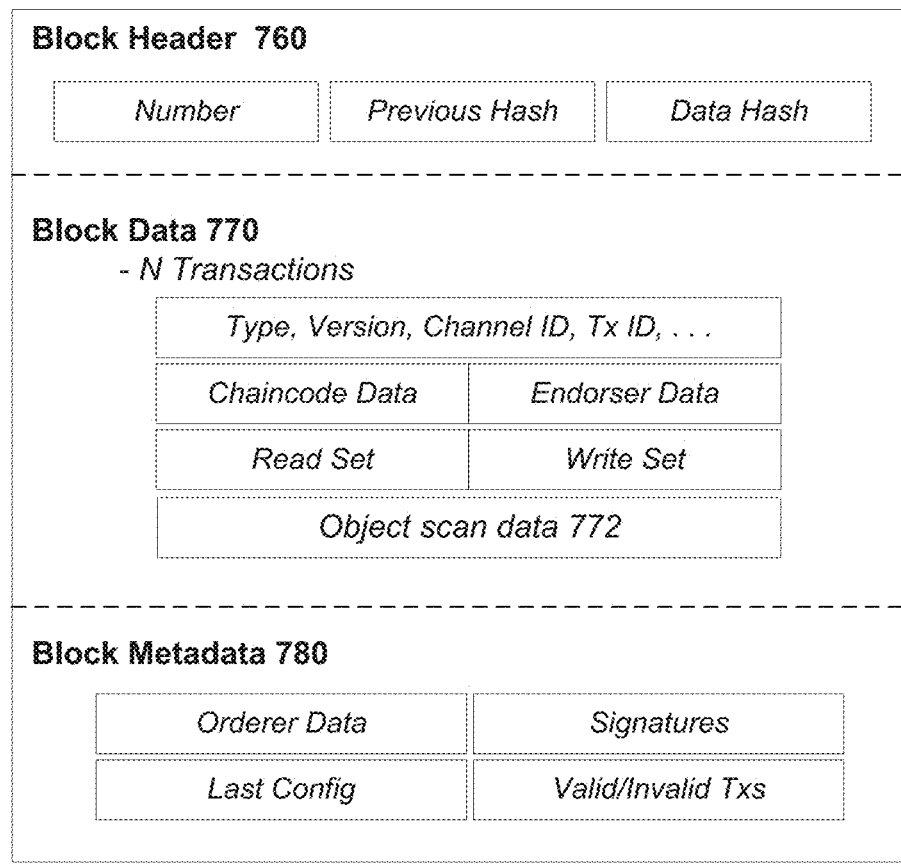
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's contents and/or header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's contents and/or header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730 (see FIG. 7A), a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store object scan data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
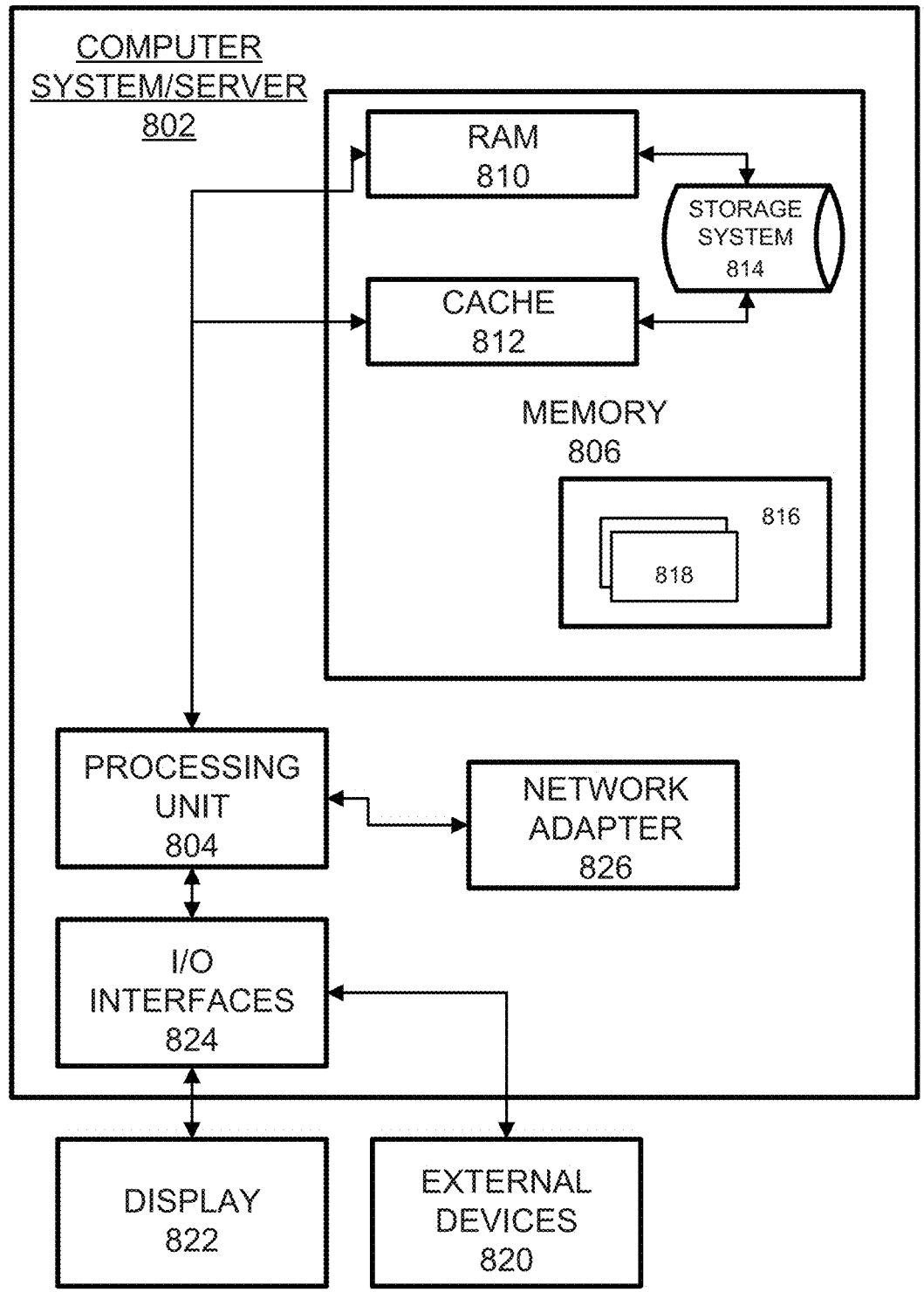
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive").

Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include one or more program product having a set (e.g., one or more) of program modules that are configured to carry out the functions of various embodiments of the application.

Program/utility 816, having a set (one or more) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of one or more of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
   a transmitter configured to transmit a data block to a decentralized database that includes a blockchain;
   a memory configured to store the data block, authentication rules, scan properties, and scan data;
   a scanning device; and
   a processor configured to:
      determine the scan properties,
      operate the scanning device to capture the scan data for a physical object based on the scan properties and the authentication rules,
      generate the data block for the blockchain based on the scan data and the scan properties, and
      authenticate the physical object based on a comparison of the scan data included in the generated data block and scan data of the physical object included in a previously stored data block stored on the blockchain.

2. The system of claim 1, further comprising a receiver to receive a second data block,
   wherein the processor configured to determine the scan properties comprises the processor configured to determine the scan properties based on the second data block, and
   wherein the processor is further configured to: determine second scan data from the second data block, compare the scan data to the second scan data, and indicate a result of the comparison of the scan data to the second scan data.

3. The system of claim 2, wherein the processor configured to operate the scanning device to capture the scan data for the physical object based on the scan properties comprises the processor configured to:
   authenticate an exchange based on buyer data and seller data, and
   responsive to the successful authentication of the exchange, operate the scanning device to capture the scan data for the physical object based on the scan properties.

4. The system of claim 2, wherein the processor is further configured to:
   determine second authentication rules,
   determine second scan properties,
   operate the scanning device to capture third scan data for the physical object based on the second scan properties and the second authentication rules, and
   generate a third data block based on the second scan data and the second scan properties;
   and wherein the transmitter configured to transmit the data block to the decentralized database comprises the transmitter configured to transmit the third data block to the decentralized database.

5. The system of claim 4, wherein the processor is further configured to:
   determine time and location data, and
   associate the time and location data with the third data block.

6. The system of claim 1, wherein the scan properties comprise one or more of an area of the physical object, coordinates of the area of the physical object, an angle of the scanning device relative to the physical object, a center point on the physical object, coordinates of the center point of the physical object, and a scanning algorithm.

7. The system of claim 1, wherein the scan data comprises a plurality of images, and wherein the authentication rules comprise a number of the plurality of images.

8. A method, comprising:
   determining authentication rules;
   determining scan properties;
   operating a scanning device to capture scan data for a physical object based on the scan properties and the authentication rules;
   generating a data block for a blockchain based on the scan data and the scan properties;
   transmitting the data block to a decentralized database; and
   authenticating the physical object based on a comparison of the scan data included in the generated data block and scan data of the physical object included in a previously stored data block stored on the blockchain.

9. The method of claim 8, further comprising:
   receiving a second data block,
   determining the scan properties based on the second data block,
   determining second scan data from the second data block,
   comparing the scan data to the second scan data, and
   indicating a result of the comparison of the scan data to the second scan data.

10. The method of claim 9, wherein operating the scanning device to capture the scan data for the physical object based on the scan properties comprises:
    authenticating an exchange based on buyer data and seller data, and
    responsive to successfully authenticating the exchange, operating the scanning device to capture the scan data for the physical object based on the scan properties.

11. The method of claim 9, further comprising:
    determining second authentication rules,
    determining second scan properties,
    operating the scanning device to capture third scan data for the physical object based on the second scan properties and the second authentication rules, and
    generating a third data block based on the second scan data and the second scan properties; and
    wherein transmitting the data block to the decentralized database comprises transmitting the third data block to the decentralized database.

12. The method of claim 11, further comprising determining time and location data, and associating the time and location data with the third data block.

13. The method of claim 8, wherein the scan properties comprise one or more of an area of the physical object, coordinates of the area of the physical object, an angle of the scanning device relative to the physical object, a center point on the physical object, coordinates of the center point of the physical object and a scanning algorithm.

14. The method of claim 8, wherein the scan data comprises a plurality of images, and wherein the authentication rules comprise a number of the plurality of images.

15. A non-transitory computer readable medium comprising instructions, that when read by a processor, cause the processor to perform:
   determining authentication rules;
   determining scan properties;
   operating a scanning device to capture scan data for a physical object based on the scan properties and the authentication rules;
   generating a data block for the blockchain based on the scan data and the scan properties; and
   transmitting the data block to a decentralized database; and
   authenticating the physical object based on a comparison of the scan data included in the generated data block and scan data of the physical object included in a previously stored data block stored on the blockchain.

16. The non-transitory computer readable medium of claim 15, further comprising instructions, that when read by the processor, cause the processor to perform:
   receiving a second data block,
   determining the scan properties based on the second data block,
   determining second scan data from the second data block,
   comparing the scan data to the second scan data, and
   indicating a result of the comparison of the scan data to the second scan data.

17. The non-transitory computer readable medium of claim 16, wherein the instructions that cause the processor to perform operating the scanning device to capture the scan data for the physical object based on the scan properties instructions, that when read by the processor, cause the processor to perform:
   authenticating an exchange based on buyer data and seller data, and
   responsive to successfully authenticating the exchange, operating the scanning device to capture the scan data for the physical object based on the scan properties.

18. The non-transitory computer readable medium of claim 16, further comprising instructions, that when read by the processor, cause the processor to perform:
   determining second authentication rules,
   determining second scan properties,
   operating the scanning device to capture third scan data for the physical object based on the second scan properties and the second authentication rules, and
   generating a third data block based on the second scan data and the second scan properties; and
   wherein transmitting the data block to the decentralized database comprises transmitting the third data block to the decentralized database.

19. The non-transitory computer readable medium of claim 18, further comprising instructions, that when read by the processor, cause the processor to perform determining time and location data, and associating the time and location data with the third data block.

20. The non-transitory computer readable medium of claim 15, wherein the scan properties comprise one or more of an area of the physical object, coordinates of the area of the physical object, an angle of the scanning device relative to the physical object, a center point on the physical object, coordinates of the center point of the physical object, and scanning algorithm.

* * * * *